Figure 1:
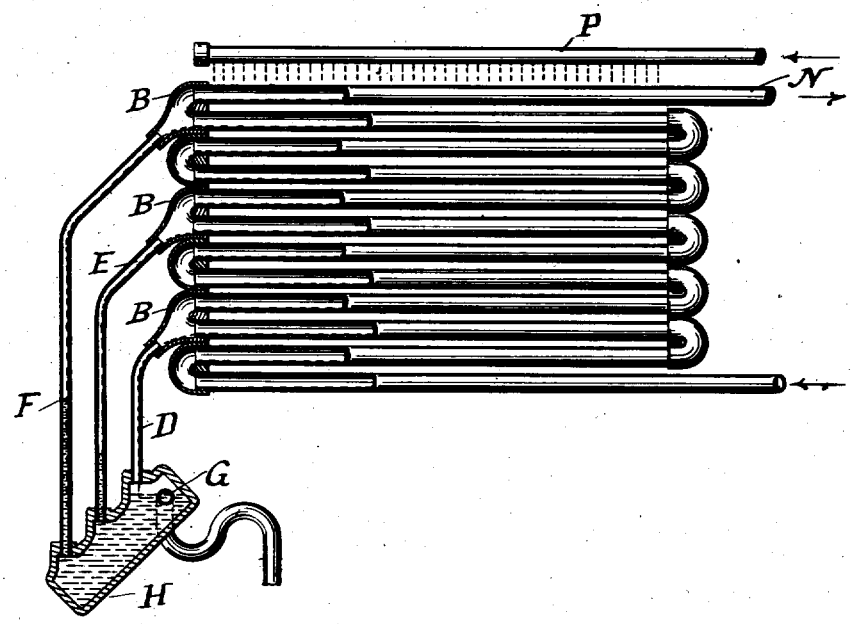

No. 12,092. REISSUED MAR. 3, 1903.

N. H. HILLER.

DISTILLING APPARATUS.

APPLICATION FILED JAN. 21, 1902.

Witnesses
Charles Hanmann
W. R. Talbot

Nicolai H. Hiller
Inventor

By his Attorney
Chas. A. Barber

UNITED STATES PATENT OFFICE.

NICOLAI H. HILLER, OF CARBONDALE, PENNSYLVANIA.

DISTILLING APPARATUS.

SPECIFICATION forming part of Reissued Letters Patent No. 12,092, dated March 3, 1903.

Original No. 667,522, dated February 5, 1901. Application for reissue filed January 21, 1902. Serial No. 90,725.

*To all whom it may concern:*

Be it known that I, NICOLAI H. HILLER, a citizen of the United States, residing at Carbondale, in the county of Lackawanna and State of Pennsylvania, have invented certain new and useful Improvements in Distilling Apparatus, of which the following is a specification, reference being had therein to the accompanying drawings.

This invention relates to apparatus for rectifying volatile gases distilled from aqueous solutions.

The type of apparatus illustrated in the drawings and with which my invention is embodied comprises, essentially, a return-bend coil, through which the gas is passed, and a sprinkling-trough, which distributes a thin film of water over the coil, the return-bends at various heights being tapped by drip-pipes to receive the moisture or liquor deposited on the coil-pipes and convey the same to a receiver or header, from which this condensation is returned to the still.

Figure 2:
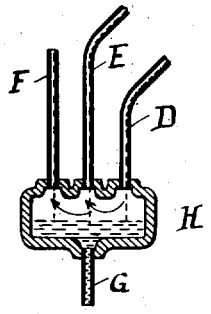
Figure 3:
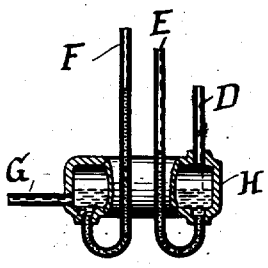

In the accompanying drawings, Figure 1 represents such parts as will give a full understanding of the apparatus and with which my invention is embodied; Fig. 2, a detached view of that part of the apparatus as heretofore used and to which my invention appertains, and Fig. 3 is a detached view of a header arranged horizontally with the respective pipes relatively connected like Fig. 1.

Referring to the drawings, it will be understood that the gas to be rectified enters the coil through the pipes M at the bottom and passes out through the pipe N at the top.

P is a sprinkling-trough, which distributes a thin film of water over the coil in the usual way. The return-bends B are tapped at various heights of the coil and communicate with drip-pipes D E F and through which the condensed liquor deposited in the coil-pipes A is conveyed to the receiver or header H and from this is returned to the still by means of a pipe G, this method of operation being well known in this class of apparatus in association with the horizontal receiver or header shown in Fig. 2.

In the use of the apparatus as referred to—that is, with the receiver or header H placed in its horizontal position and connected with the drip and return pipes, as shown in Fig. 2—a certain percentage of the gas passing down the lower drip-pipe D is by-passed through the other drip-pipes E and F and thus escapes rectification.

The object of the present invention is to obviate this difficulty by preventing this by-passing of the gas through the pipes D E F in order to obtain a more perfect rectification.

With this invention the process of condensation is progressive and accordingly the moisture or liquor is successively deposited in the tubes and from the successive coils or return-bends B it passes to the receiver or header H and accumulates therein and covers and seals the inlets thereto, which prevents the by-passing of such gases that would escape rectification.

In carrying out my invention I connect the return-pipe G with the header at a point below the first drip-pipe D and above the drip-pipes E and F, whereby the latter are sealed by the liquor and all by-passing of the gas thereby prevented. This may be accomplished by placing the receiver or header H in an inclined position, with the drip-pipes connected at different planes of elevation and the return-pipe G below the first drip-pipe D and above the drip-pipes E and F, as shown in Fig. 1 or as shown in Fig. 3, wherein the same relative connection of the respective pipes is made with a header used in a horizontal position.

While either arrangement above referred to will practically secure the result desired, I prefer the former arrangement—that is, with the header inclined, as shown in Fig. 1, which provides for any great variation of pressure between the coil-pipes M N, whereby the level of the liquid in the header might suddenly drop below the drip-pipe E. In this event the pipe F would still be sealed, due to its connection with the header at a lower point.

It will be observed that when the drip-pipes D E F are connected with the coil at different elevations the height of the liquid column will be greater in the pipe F than in the pipe E preceding, due to the decreased pressure in the higher return-bend connecting with the pipe E.

Having thus fully described my invention, what I claim, and desire to secure by Letters Patent, is—

1. In an apparatus for rectifying volatile gases, a condensing-coil or equivalent; a series of drip-pipes connecting with said coil at different heights; a header or receiver connected to said drip-pipes in which the liquor is collected, and also connected with the still where it is returned for redistillation, and means for holding a quantity of the liquor in the connected passages to seal the same and prevent the by-passing of the gases as set forth.

2. In an apparatus for rectifying volatile gases, comprising a condensing-coil or equivalent, and a series of drip-pipes connecting with said coil at different heights and with a header or receiver in which the condensed liquor is collected and from which it is returned to the still for redistillation, a header having the return-pipe connected at a point beneath the first drip-pipe connection and above the successive drip-pipe connections, whereby the latter are sealed by the liquor and the by-passing of the gas prevented, substantially as described.

3. The header or receiver H inclined from a level position with the drip-pipes connected at different heights of the collected liquor and the return-pipe connected at a point beneath the first drip-pipe connection, substantially as shown and for the purpose set forth.

In testimony whereof I affix my signature in presence of two witnesses.

NICOLAI H. HILLER.

Witnesses:
CHAS. W. FORBES,
CHARLES HANIMANN.